US008594977B2

(12) United States Patent
Laberge et al.

(10) Patent No.: US 8,594,977 B2
(45) Date of Patent: Nov. 26, 2013

(54) METHOD AND SYSTEM FOR IDENTIFYING SYSTEMIC FAILURES AND ROOT CAUSES OF INCIDENTS (75) Inventors: Jason Laberge, New Brighton, MN (US); Peter Bullemer, Independence, MN (US)

(73) Assignee: Honeywell International Inc., Morristown, NJ (US)

( * ) Notice: Subject to any disclaimer, the term of this patent is extended or adjusted under 35 U.S.C. 154(b) by 372 days.

(21) Appl. No.: 12/478,071

(22) Filed: Jun. 4, 2009

(65) Prior Publication Data

US 2010/0312522 A1    Dec. 9, 2010

(51) Int. Cl.
*G06F 15/00* (2006.01)

(52) U.S. Cl.
USPC ............ 702/184; 707/200; 707/803; 340/507

(58) Field of Classification Search
USPC .................. 702/184, 200, 803; 707/200, 803; 340/507
See application file for complete search history.

(56) References Cited

U.S. PATENT DOCUMENTS

| | | | |
|---|---|---|---|
| 6,735,597 B1 * | 5/2004 | Paradies ..................... | 707/803 |
| 7,096,074 B2 | 8/2006 | Yulevitch et al. .............. | 700/21 |
| 7,133,756 B2 | 11/2006 | Jammu et al. .................. | 701/29 |
| 7,333,977 B2 | 2/2008 | Swaminathan et al. ........ | 707/3 |
| 7,349,746 B2 | 3/2008 | Emigholz et al. .............. | 700/21 |
| 7,421,351 B2 | 9/2008 | Navratil ........................ | 702/58 |
| 7,440,932 B2 | 10/2008 | Gartland et al. ............... | 706/46 |
| 7,469,287 B1 | 12/2008 | Castillo et al. ................ | 709/224 |
| 2003/0233387 A1 | 12/2003 | Watanabe et al. ............. | 709/100 |
| 2004/0103121 A1 * | 5/2004 | Johnson et al. ............... | 707/200 |
| 2008/0167842 A1 | 7/2008 | Cochran et al. ................ | 703/2 |
| 2008/0229421 A1 | 9/2008 | Hudis et al. .................... | 726/25 |
| 2008/0252441 A1 * | 10/2008 | McElfresh et al. ........... | 340/507 |
| 2008/0256395 A1 | 10/2008 | Araujo et al. ................. | 714/43 |
| 2009/0005896 A1 | 1/2009 | Gifford et al. ................ | 700/121 |
| 2009/0055684 A1 | 2/2009 | Jamjoom et al. .............. | 714/26 |
| 2009/0089112 A1 * | 4/2009 | Mullen et al. ................. | 705/7 |

OTHER PUBLICATIONS

LaBerge, J.C., Bullemer, P., Whitlow, S.D.; Communication and Coordination Failures in the Process Industries.

(Continued)

*Primary Examiner* — Marc Armand
*Assistant Examiner* — Haidong Zhang
(74) *Attorney, Agent, or Firm* — Kermit D. Lopez; Luis M. Ortiz; Ortiz & Lopez, PLLC (57) ABSTRACT

A method and system for identifying systemic failures and a root cause of incidents in a work environment. Failures, causes, and impacts related to a sample of incidents can be investigated in order to identify one or more systemic failures and root causes of the systemic failure(s). The incident details can be utilized to identify one or more root cause manifestation for each root cause of the systemic failure(s). The gaps in an existing system can be analyzed and one or more improvement solutions based on corrective actions can be identified. The improvement solutions with a highest priority can be selected and implemented to address the gaps identified in the current system based on the analysis of systemic failures and root causes. The effectiveness of the improvement solutions can be tracked and monitored to prevent the recurrence of future incidents.

19 Claims, 8 Drawing Sheets

(56) References Cited

OTHER PUBLICATIONS

Elsass, M., Saravanarajan, Davis, J.F., Mylaraswamy D., Reising, D. V., Josephson, J.; Information Management in an Integrated Decision Support Framework for Process Fault Detection and Diagnosis; Nov. 7, 2002; Abnormal Situation Management Consortium.

Buellemer, P., Barreth, R., LaBerge, J., Nimmo, I.; ASM Consortium Guidelines, Effective Operations Practices; ASM Consortium Proprietary, Version 6.00, Mar. 3, 2009.

Bullemer, P.T., ASM Better Metrics for Improving Human Reliability in Process Safety; Abnormal Situation Management Consortium. Industry Best Practice Book—Center for Chemical Process Safety (2003). *Guidelines for Investigating Chemical Process Incidents* ($2^{nd}$ Ed). New York: American Institute of Chemical Engineers.

Software/Work Process Consultants—Paradies, M. & Unger, L. (2000). *TapRoot®. The system for root cause analysis, problem investigation, and proactive improvement*. Knoxville, TN: System Improvement, Inc.

* cited by examiner

| MANIFESTATION |
| --- |
| ANALYSIS WAS NOT COMPREHENSIVE (EQUIPMENT, CONDITIONS, PAST INCIDENTS, HUMAN FACTORS, RISKS, KNOWN STANDARDS/HAZARDS, SAFETY/FIRE SYSTEMS, COMMUNICATION SYSTEMS, QUALITATIVE VS. QUANTITATIVE, BEYOND LIT REVIEW, OPERATIONS MODES (INCL. STARTUP AND SHUTDOWN) |
| RELIANCE ON CHECK BOXES |
| POOR RISK ASSESSMENT PRACTICES (CREDIBLE SCENARIOS) |
| FAULTY ASSUMPTIONS WERE MADE ABOUT HAZARDS |
| ANALYSIS WAS NOT COMPLETED EVEN THOUGH REQUIREMENT EXISTED (INCL. REVALIDATION) |
| RISK MITIGATION PLANS WERE MISSING, INCOMPLETE, OR INEFFECTIVE (DID NOT FULLY UNDERSTAND HAZARDS) |
| ANALYSIS DOES NOT INCLUDE THE RIGHT PEOPLE |

METHOD AND SYSTEM FOR IDENTIFYING SYSTEMIC FAILURES AND ROOT CAUSES OF INCIDENTS

TECHNICAL FIELD

Embodiments are generally related to data-processing and root cause analysis. Embodiments are also related to the identification of systemic failures and root causes of incidents in a work environment.

BACKGROUND OF THE INVENTION

Work environments such as, for example, process control, nuclear power, health care, military, and manufacturing generally lack a shared understanding of systemic failures and causes related to incidents. An "incident" in these examples may be an "actual loss" event that may be investigated so that effective action can be taken to prevent the same or similar losses from again occurring. A "near miss" event can also be considered an "incident". In this case, no actual loss may have occurred, but the potential for a loss may have been present. A "near miss" may be considered an occurrence in which "actual loss" (e.g., property damage, environmental impact, or human loss) or an operational interruption could have plausibly resulted if circumstances had been slightly different. Such events can thus be considered "incidents," "process upsets," or "system upsets", wherein such a "system" includes human components and machine portions in a work environment.

Incidents may result from the failure of field devices such as, for example, instrumentation, control valves, and pumps or from some form of process disturbance that causes operations to deviate from a normal operating state. Incidents also occur due to human factor and related failures such as human error or problems with current management systems (e.g., training, work processes, procedures, communications, supervision, etc). Early detection of such failures, whether they are operations practice failures, equipment failures, or management systems problems enables an operation team to improve current practices to prevent incidents from occurring in the future or supporting more effective response when problems occur. Continuous learning from incidents and understanding systemic failures is a key to developing effective corrective actions with long-term benefit.

Based on the foregoing, it is believed that a need exists for an improved method and system for effectively identifying a systemic failure and a root cause of incidents. In particular, a need exists for understanding failures and root causes at two basic levels: (1) for a single incident; and (2) more importantly, across incidents. It is believed that analyzing across incidents is a crucial factor to identifying systemic failures and root causes. Otherwise, one will constantly be fixing problems isolated to individual incidents and the likelihood of successful corrective actions with desired long-term and far reading effects will be much lower.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the present invention to provide for an improved data-processing system and method.

It is another aspect of the present invention to provide for an improved method and system for identifying systemic failures and root causes based on past incidents.

It is a further aspect of the present invention to provide a technique for consistently developing effective corrective actions that addresses root cause manifestations to prevent a recurrence of a systemic failure.

Note that as utilized herein, the term "incident failure" can refer to a single failure (or "what" went wrong) that occurred in a single incident. An "incident root cause" refers generally to a single root cause related to a single failure ("why" the incident failure occurred) in a single incident. A "systemic failure" refers generally to a failure (two or more single incident failures) across two or more incidents (e.g., a sample). A "systemic root cause" refers generally to a common root cause (two or more single incident root causes) for a systemic failure across two or more incidents (e.g., a sample). A given incident may have more than one root cause or failure. The term "root cause manifestation" as utilized herein generally refers to the manner in which the systemic root cause was exhibited in a single incident. The manifestations are a key factor in rendering the systemic failures and root causes actionable (e.g., to identify gaps and develop effective corrective actions). Finally, the term "current system" as utilized herein can refer to barriers/safeguards (e.g., ESD devices, physical barriers), management systems (e.g., training, procedures, policies, work processes), technology (e.g., HMI, support systems) and organizational influences (e.g., culture, management structure).

The aforementioned aspects and other objectives and advantages can now be achieved as described herein. A method and system for identifying systemic failures and root causes of incidents in a work environment is disclosed. Failures, causes, and impacts related to incidents can be investigated in order to identify one or more systemic failure modes and the root cause of the systemic failure modes. The systemic failure modes, root causes, and individual incident details can be utilized to identify a root cause manifestation. Additionally, it is important to note that the failures and root causes can be hierarchical (based on the root cause analysis method utilized during the incident investigation) and analysis for systemic failures and root causes can occur at different levels in the hierarchy.

The gaps in the current system can be analyzed utilizing the root cause manifestation and one or more improvement solutions based on a corrective action can be identified. The improvement solutions with a highest priority can be selected and implemented to address the gaps identified. The effectiveness of the improvement solutions can be tracked and monitored.

Such a comprehensive work process can be integrated into an existing incident management program. Note that in some cases, the work process can also be integrated into its existing event reporting and analysis tools. The work process identifies the systemic failures, common root causes for each systemic failure, and necessary corrective actions to improve safety performance of current systems. The work process requires an effective event monitoring and reporting system to investigate incidents and integrate data, a formal work process to analyze failures/causes and impacts across incidents, and a comprehensive program to measure and track improvement solution effectiveness.

An analyst or incident investigator, for example, can perform a periodic analysis of the incidents to determine the systemic failures and root causes. The comprehensive and formal work process includes methods for aggregating individual failures across a sample of incidents and identifying systemic failures and root causes. When a common language that defines the failure and root cause types that can occur in an incident does not exist, it is necessary to cluster the individual failures and root causes across the incident sample. Clustering is usually done through a consensus process whereby the analyst or team agree on the systemic failures and root causes based on the individual failures and root causes that occurred in each incident. The systemic failures and root causes are used to identify the manifestations of root causes in each incident to identify gaps in current system effectiveness. A key aspect of the disclosed approach involves the method utilized to analyze systemic failures and root causes (across incidents), gaps, and improvement opportunities. The gaps can be utilized to identify improvement opportunities, develop and implement corrective actions, and monitor progress and results. Such a work process can be utilized in applications such as, for example, alarm management, operations management, emissions monitoring, equipment monitoring, and information management. The disclosed approach can also be utilized in, for example, a process control domain, materials manufacturing, and a security domain for analyzing security incidents for common problems (systemic failures) and root causes that can lead to new or improvements to existing processes, services, products, management systems (e.g., training, procedures, polices, etc) and so forth.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

Figure 1:
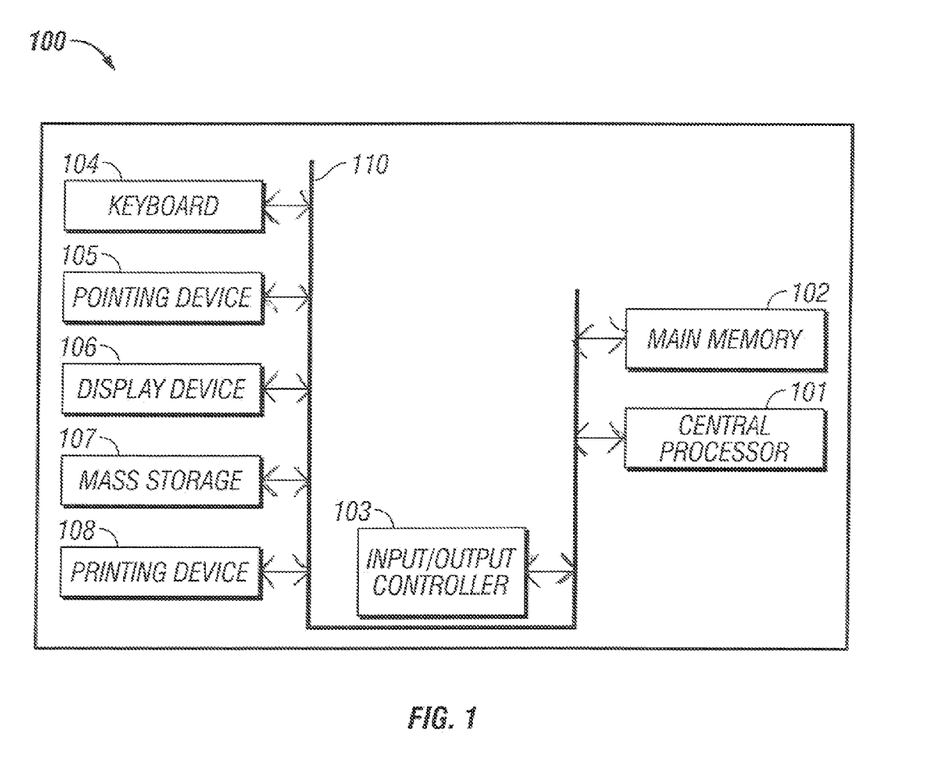
FIG. 1 illustrates a data-processing apparatus, which may be utilized to carry out an embodiment of the present invention.
Figure 2:
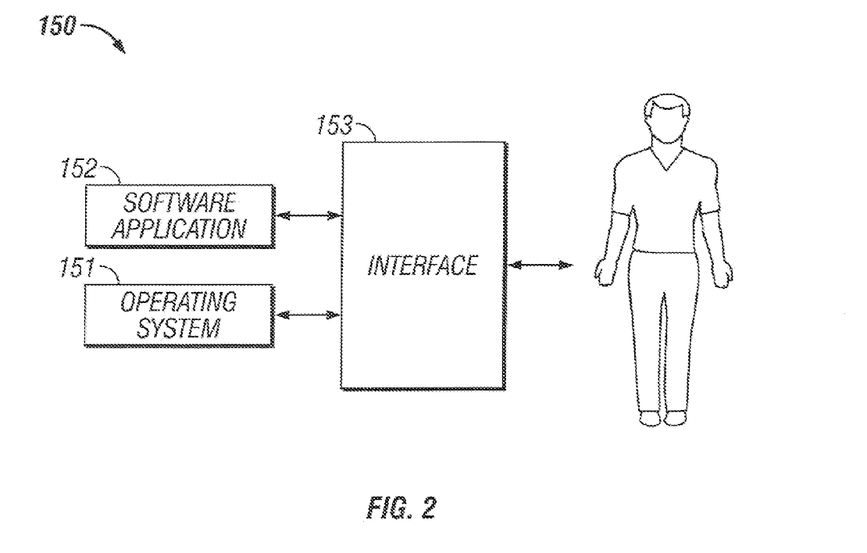
FIG. 2 illustrates a schematic view of a system that includes an operating system, application software, and a user interface that may be utilized for carrying out an embodiment of the present invention.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

FIG. 1 illustrates an example of a data-processing apparatus 100, which may assist in carrying out an embodiment of the present invention. The data-processing apparatus 100 generally includes a central processor 101, a main memory 102, an input/output controller 103, an input device such as, for example, a keyboard 104, a pointing device 105 (e.g., mouse, track ball, pen device, or the like), a display device 106, and a mass storage 107 (e.g., hard disk). Additional input/output devices, such as a rendering device 108, may be utilized in association with the data-processing apparatus 100 as desired. As illustrated, the various components of the data-processing apparatus 100 communicate through a system bus 110 or similar architecture.

FIG. 2 illustrates an example of a software system 150 that can be utilized for directing the operation of the data-processing apparatus 100. Software system 150, which is stored in system memory 102 and on disk memory 107, includes a kernel or operating system 151 and a shell or interface 153. One or more application programs, such as application software 152, may be "loaded" (i.e., transferred from storage 107 into memory 102) for execution via the data-processing apparatus 100. The data-processing apparatus 100 receives user commands and data through user interface 153; these inputs may then be acted upon by the data-processing apparatus 100 in accordance with instructions from operating module 151 and/or application module 152.

The interface 153, which is preferably a graphical user interface (GUI), also serves to display results, whereupon the user may supply additional inputs or terminate the session. In one particular embodiment, operating system 151 and interface 153 can be implemented in the context of a "Windows" system. In another embodiment, operating system 151 and interface 153 may be implemented in the context of other operating systems such as Linux, UNIX, etc. Application module 152, on the other hand, can include instructions such as the various operations described herein with respect to the various components and modules described herein such as, for example, the method 500 depicted in FIG. 5.

Incident analysis forms an important source of information for improvements in safety, reliability, and maintainability of any complex system. The underlying systemic failures can be identified for the development of effective corrective actions for the real problems that cause, or significantly contribute to, incidents. The effective corrective action can be implemented to achieve dramatic, lasting reductions in the numbers of repeat incidents. The system and method described herein prevent the occurrence of a costly incident by identifying the underlying systemic failures and root causes of incidents in a work environment and implementing a specific corrective action directed to eliminate the specific underlying systemic failures and root causes.

Figure 3:
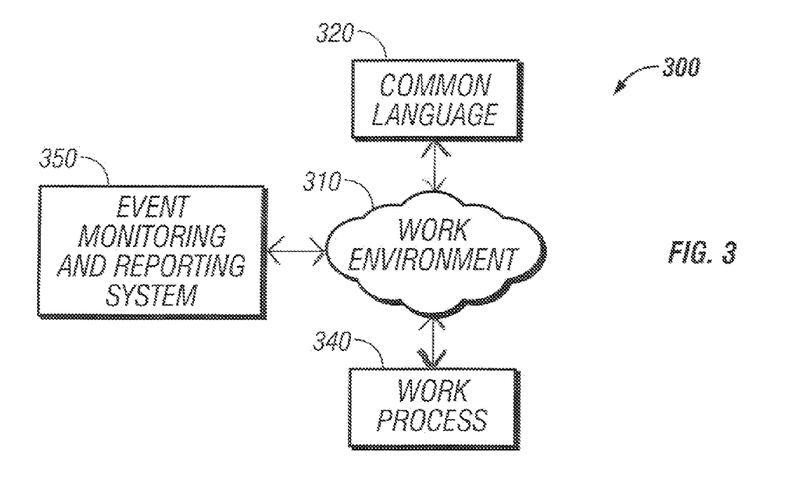
FIG. 3 illustrates a block diagram of a work environment, which can be implemented in accordance with an embodiment.

FIG. 3 illustrates a block diagram of a work environment 300, which can be implemented in accordance with an embodiment. Note that in FIGS. 1-8, identical or similar blocks are generally indicated by identical reference numerals. The work environment 300 can be, for example, process control plants, communication or power networks, security domains, financial markets, and other collaborative work environments. The work environment 300 can be configured to include a common language 320, an event monitoring and reporting system 350, and a formal work process 340. Note that the event monitoring and reporting system 350 can be effectively implemented by a system or device such as the data-processing apparatus 100 depicted in FIG. 1. The work process 340 may include a comprehensive program that defined methods for the effective analysis of incidents regardless of the domain or scope of the incident. The comprehensiveness can be achieved via the work environment 300 and 310, the event monitoring and reporting system 350, the common language 320, and the work process 340. In general, incidents are a result of failures or problems with current systems in the work environment 300 and 310. Note in general that the term "incident failure" refers to a failure from a single incident (as a result of an investigation) and the term "systemic failure" refers to failures across a sample of incidents (two or more incident failures together). Systemic failures may derive from two potential sources: (1) directly from the common language 320 (if the site has one); or (2) via clustering or some other consensus activity (if there is no common language 320).

The common language 320 describes incident types, causes, failures, and impacts using consistent terminology across the domain of interest. The common language 320 ensures that analyses are consistent across investigations and supports aggregation for the purposes of systemic analyses of failures and root causes. The effective event monitoring and reporting system 350 track the details (failures, causes, and impacts) of the incidents and describes requirements for integrating data across incidents and systems based on the common language 320. The work process 340 provides a methodology for periodic analysis of incidents to determine the systemic or recurring failures and root causes. The formal work process 340 includes specific methods for aggregating or clustering incident failures across multiple incidents, achieving consensus on systemic failures and root causes and extracting manifestations of root causes to develop effective and targeted solutions. The common language 320 generally defines the types of failures and root causes that can be identified when incidents are analyzed. Some may include problems with controllers (or sensors), but others may be totally "people oriented" (e.g., someone was not properly trained or lack of supervision).

Referring to FIG. 1, the input device 104 can be utilized for inputting incident analysis information relating to a particular incident and for converting the incident information into a system-compatible format. The memory device 107 stores information that provides a relationship between the sequence of events in the incident, incident failures (or failure types if the common language exists), and root causes. Systemic failures and root causes can be stored across one or more incidents and the corrective actions that may be implemented to prevent future occurrences of the incidents can also be stored in the memory device 107. The processor 101 accesses the information database and could track the corrective actions that have been identified and implemented using the work process. Note that the processor 101 does not implement the corrective action. The work process supports the identification of appropriate corrective actions, but is up to the analysis team (e.g., via consensus or some other approach) to identify, prioritize, and implement any corrective actions. The display device 106 connected to the processor 101 displays a graphic representation of the multiple analysis levels. The display device 106 also displays the effectiveness of the corrective actions that have been implemented through the presentation of leading and lagging metrics to monitor solution success.

Figure 4:
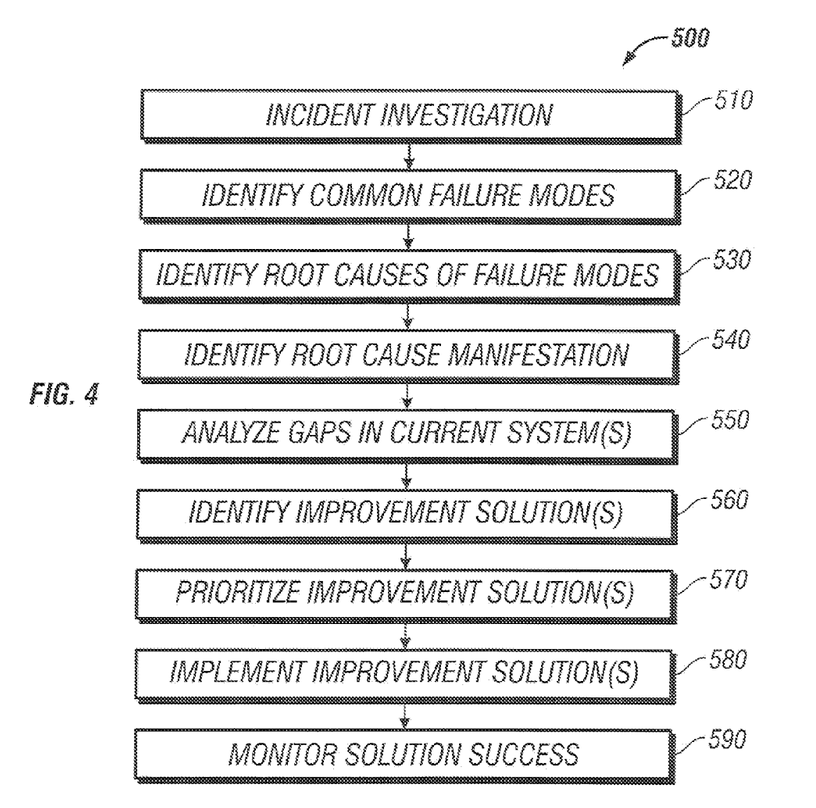
FIG. 4 illustrates a flow chart of operations illustrating logical operational steps of a method for identifying systemic failures and root causes of incidents in the work environment, in accordance with an embodiment.

FIG. 4 illustrates a flow chart of operations illustrating logical operational steps of a method 500 for identifying systemic failures and root causes of incidents in the work environment 300, in accordance with an embodiment. Incidents in the work environment 300 can be investigated, as depicted at block 510. Thereafter, one or more systemic failure modes can be identified based on a sample of incidents, as indicated at block 520. The root causes of the systemic failure modes can be identified, as illustrated at block 530. Note that the root cause profiles can be utilized to identify a root cause manifestation, as depicted at block 540. It is important to note, however, that such root cause profiles are utilized for visualizing the systemic root causes (i.e., tied to the systemic failure mode). Such profiles assist in identifying why a particular systemic failure mode occurred. The key feature to keep in mind, however, is identifying the frequent causes for each failure and then returning to analyze the incident details to extract manifestations and identify gaps.

Following the processing of the operation illustrated at block 540, the gaps in the current system can be analyzed, as indicted at block 550. Note that there are multiple techniques that can be utilized to assess gaps. In most cases, gaps can be assessed relative to some aspect of the current system (e.g., training, procedures, operator selection, supervision, policies, etc.). For each current system element that is to be evaluated in the gap analysis, for example, the investigation team must assess whether the system addresses the root cause manifestation. One example of a subjective rating scale is as follows:

1=does not address the root cause manifestation. These are considered gaps.
3=partially addresses the root cause manifestation; solution would require another solution for full coverage.
9=fully addresses the root cause manifestation; solution in and of itself would be sufficient to address root cause.

Development of corrective actions and improvement solutions could focus on ratings of '1'.

Following the processing of the operation depicted at block 550, potential improvement solutions based on the analyzed gaps can be identified, as illustrated at block 560. The improvement solutions can be prioritized, as depicted at block 570. The high priority improvement solutions can be implemented as corrective actions, as shown at block 580. The implemented corrective actions can be monitored, as illustrated at block 590.

Figure 5:
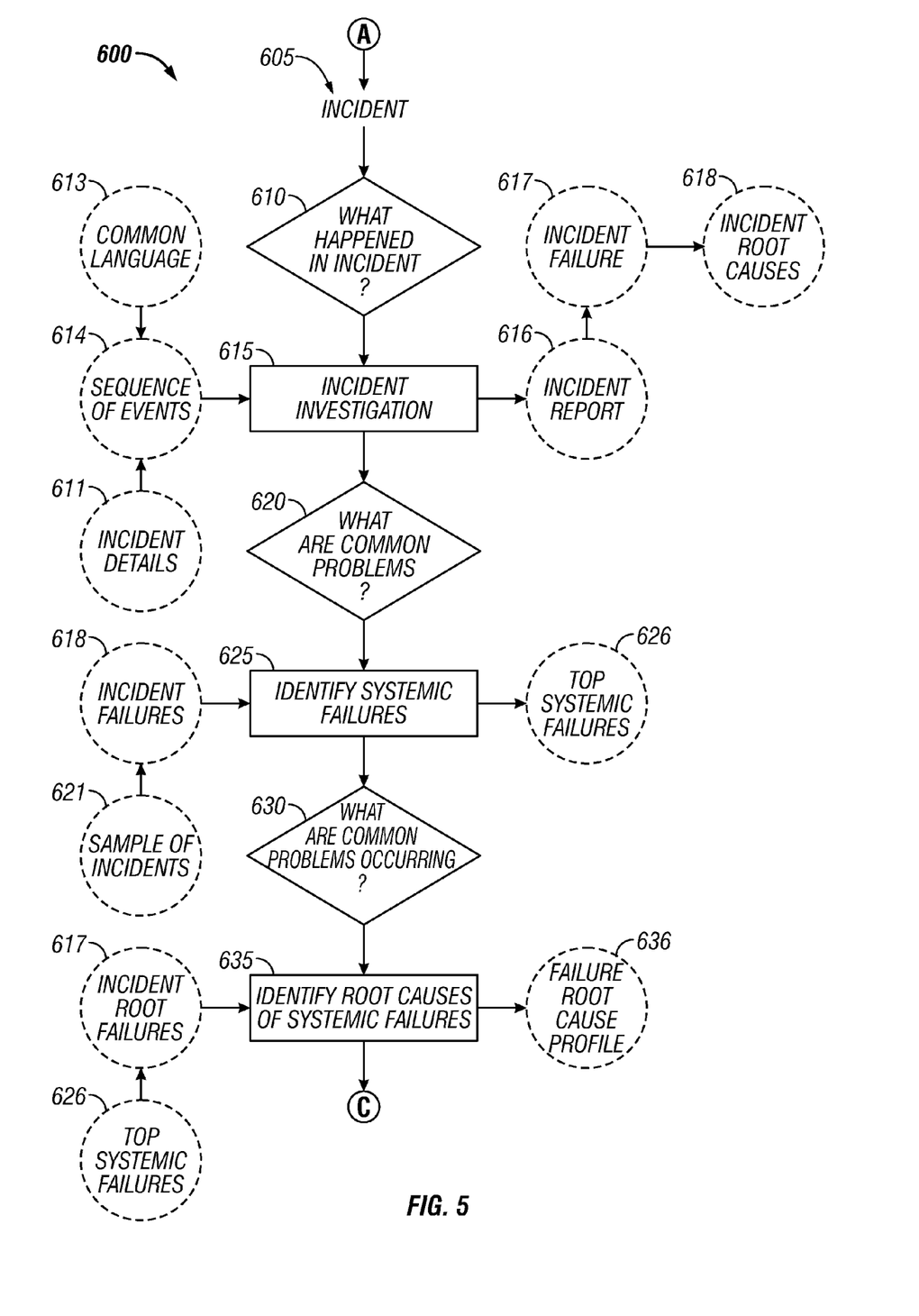
FIGS. 5-7 illustrate a detailed flow chart of operations illustrating logical operational steps of a method for identifying root causes of incidents and implementing corrective actions to prevent a recurrence of the incident, in accordance with an embodiment.
Figure 6:
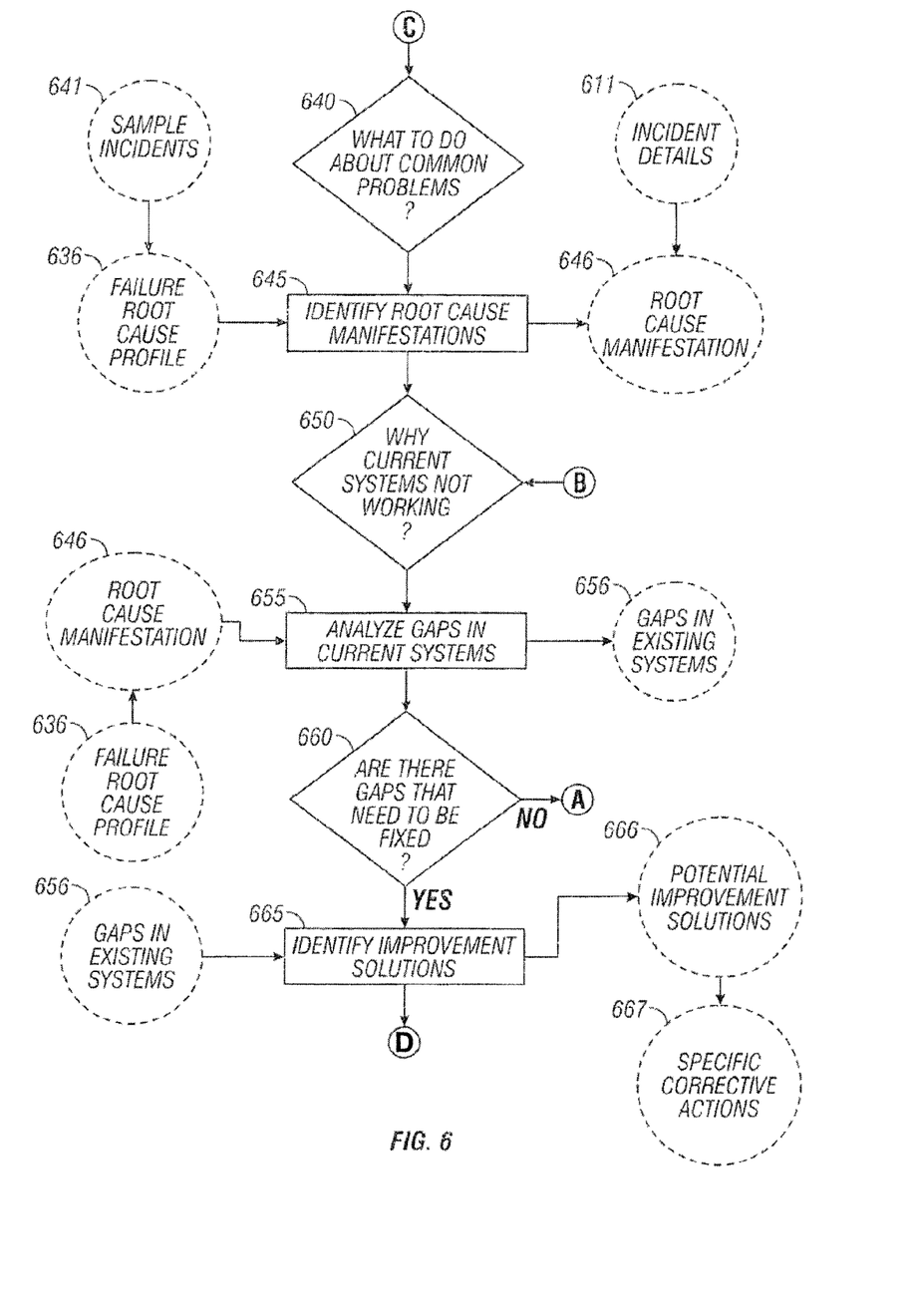
Figure 7:
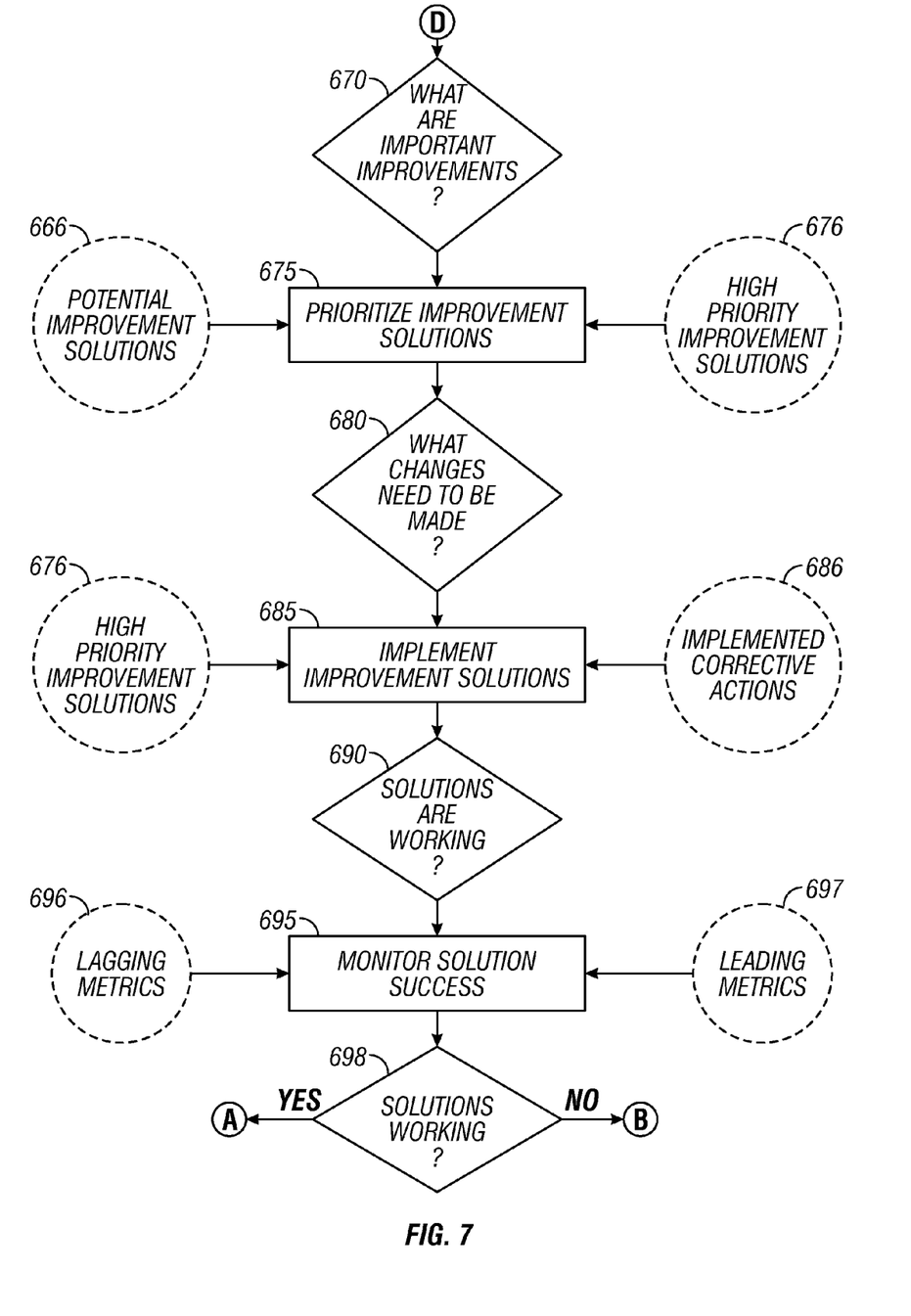

FIGS. 5-7 illustrate a detailed flow chart of operations illustrating logical operational steps of a method 600 for identifying failures and root causes of an incident and implementing corrective actions to prevent a recurrence of incidents, in accordance with an embodiment. Note that the method or flow process illustrated in FIGS. 6 and 7 represent a continuation of the flow depicted in FIG. 5.

As indicated at block 605, an "incident" can be investigated in order to determine what occurred in that incident, as depicted at blocks 610 and 615. The incident 605 can be investigated by modeling a sequence of events as indicated at block 614 and identifying failures and root causes based on a common language (e.g., common language 320), as indicated at block 613. As indicated at block 616, an incident report comprising incident failures and root causes (i.e., see blocks 617 and 618) can be generated as output. The incident may be investigated by personnel involved in the incident itself. The investigations generally focus on understanding the incident failures, root causes of failures, and impacts associated with the single incident. The investigators (e.g., based on observations, interviews, independent evaluations, etc.) can document the sequence of events and identify the incident failures, root causes, and impacts utilizing the common language 320 (i.e., if one exists) for the process. A typical investigation can often identify multiple incident failures and root causes. Note that incident root causes are usually identified via another related work process. There are potentially many different approaches that can be utilized for identifying root causes. The disclosed embodiments, however, are not subject to a particular utilized method. The important point here is that whatever method is utilized can output both incident root causes (i.e., reasons for failures) and the incident failures (i.e., causal factor) themselves.

The common language 320 is the basis for the failure and root cause types and can be utilized to consistently analyze and describe incidents across the process. The failure and the root cause types can be clearly documented and accessible site-wide and the appropriate personnel can be trained with respect to their use. The use of the common language 320 improves consistent identification and reporting of incident failures and root causes. Standard failure and root cause types may be selected as the basis for incident failures and root causes for each incident utilizing the incident reporting system 350. The root cause types can be linked to specific failure types and each failure can have one or more root causes associated with it. The incident details from the investigation that justify each incident failure and incident root cause can be utilized for identifying root cause manifestations and specific opportunities to improve current solutions.

A work process 340 for the analysis of an incident sample for systemic failures and root causes can be clearly documented which includes a frequency of analysis, personnel involved, incidents to include in the sample, aggregation rules to define top systemic failures, communication and documentation requirements to represent results, and training for appropriate personnel. The systemic failure modes can be identified by an incident analysis team in order to determine the frequent problems associated with a sample of incidents 621, as illustrated at blocks 620 and 625. The top most frequent systemic failures 626 can be generated as output. The selection of incident failures and the incident root causes based on the common language 320 supports the analysis of systemic failures (common problems) associated with the incidents described in the work process 340. In cases where a common language exists, the systemic failures are the top failure and root cause types across a sample of incidents. The analysis of systemic failures across a sample of incidents 621 can be utilized to understand frequent and recurring problems associated with the work environment 310 that if addressed can result in significant operational improvement relative to addressing problems from a single incident at a time. The frequent systemic failures can represent the percentage of failures across an incident sample. The focus can be on the top failures that account for approximately 70-80% of the total number of failure types or when the contribution of each failure type starts to level off (i.e., each failure accounts for only 1-2% of the total across the sample). Note that the embodiments discussed herein are described for purposes of clarity and specificity; however, they should not be interpreted in any limiting way.

If the work process does not have failure types (i.e., no common language), clustering can be performed manually by a team of analysts. The individual failures across the incidents in the sample 621 can be clustered/categorized and labeled to reflect the common problems. The clustering of incident failures into categories can be processed independently or face-to-face by at least two people to ensure reliability. A random sampling of incidents for each review is required if sites experience a significant number of incidents. A minimum of, for example, 12 to 15 incidents can be analyzed to ensure the findings are valid. The frequency of analysis of failures can be based on a threshold for incidents that occur. For example, failure modes may be analyzed after, for example, 12-15 new incidents occur.

The root causes of the systemic failures 626 can be identified by the incident analysis team in order to determine the reasons for common problems, as depicted at blocks 630 and 635. The root causes of the systemic failures can be identified by summing the incident root causes 617 that relate to the top failure modes 626. A failure root cause profile 636 can be generated as output. The root cause profiles 636 can be extracted for each systemic failure 626. The profiles 636 illustrate the distribution of the root causes that are identified for the failures across the sample of incidents. The profiles 636 can be utilized to identify why a particular failure mode might occur across the sample of incidents 621. Due to the potentially large number of root causes associated with each systemic failure 626, a frequency analysis can be performed to identify the root causes that have the highest impact. An individual root cause can represent at least 5% of the root causes associated with a failure mode to be considered a significant contributor to its occurrence. If the root cause falls below the significant contributor threshold, it can be associated with a root cause category named "other".

The root cause manifestation indicated at block 646 can be identified by the incident analysis team in order to determine how to address the common problems represented by the top systemic failures and the failures' root cause profiles (see block 636), as illustrated at blocks 640 and 645. As indicated in FIG. 6, sample incidents as indicated at block 641 can be compiled to determine a root cause profile, as illustrated at block 636. Note that incident details as illustrated at block 611 can be utilized to determine the root cause manifestation indicated at block 646. Root cause manifestations 646 are the detailed manner in which a root cause is manifested/expressed across the sample of incidents as indicated at block 621. The link to incident details as indicated at block 611 is important because the disclosed embodiments involve analyzing incident details from the sample of incidents 621 to identify the reason the root causes (from the profile) resulted in the systemic failure.

The details of each incident (i.e., see block 611) in the incident sample 621 that include a systemic failure represented in the list of top failures indicated at block 626 can be examined to understand the root cause manifestations that resulted in the systemic failure occurring. The manifestations indicated at block 646 represent the specific expression of a root cause in an incident and can be identified by reviewing each incident investigation from the sample of incidents for the rationales, justification or details for each root cause included in the failure root cause profile. The common rationales form the basis for the root cause manifestations depicted at block 646. Analysis of the root cause manifestations can be utilized to focus on the nuances of the incidents rather than the generic root cause types described in the profiles and are essential for identifying gaps in the current systems and developing effective corrective actions to drive improvement. A requirement of the reporting system 350 is that the failure and root cause details (i.e., rationales) are associated with one another for each incident investigation so that the root cause profiles can be generated for each systemic failure and the root cause manifestations can be tied to each cause in the profile and ultimately to each systemic failure.

As depicted at the blocks 650 and 655, gaps in the current systems 656 can be analyzed by the incident analysis team in order to determine why the current systems are not working. The current systems can be analyzed by evaluating the root cause manifestations (i.e., see block 646) for each failure root cause profile (i.e., see block 636) and identifying the gap related to the existing system (i.e., see block 656) can be generated as output. Note that the gaps should be assessed manually by the investigative team and are not automatically generated. That is, the gaps 656 are the investigation team's opinion on whether the current systems address the root cause manifestations 646 for each failure root cause profile. The evaluation of current systems relative to problems (failures) and the root cause manifestations indicated at block 646 can be utilized to identify gaps that can be addressed.

An investigation team can agree on the current systems to evaluate prior to completing the gap analysis. The current systems that are subject to the gap analysis can vary depending on the common language utilized or the focus of the investigation team with respect to their expertise. The applicable systems for each systemic failure can be analyzed for gaps relative to the root cause manifestations indicated at block 646 from the profile depicted at block 636. A simple rating scale can be utilized to evaluate the gaps based on the investigation team's opinion of how well the current systems address the root cause manifestations. For example, rating scale 1-does not address the root cause manifestation, 3-partially address the root cause manifestation (i.e., less than 50% of the root causes) and requires another solution for full coverage, and 9-completely addresses the root cause manifestation and is sufficient to address the root cause.

The analysis of the current systems can be done face-to-face by a multi-disciplinary team to minimize bias, encourage discussion/debate, and to ensure appropriate improvement opportunities are identified. The rating scale utilized is less important than the discussion and consensus achieved amongst the team. The event reporting system 350 can support the analysis and documentation of gaps associated with each systemic failure and root cause as well as individual incident failures and root causes. Specifically, the reporting system should support reviewing each incident investigation report to identify the results of the gap analysis for each incident failure and root cause. The status of any identified improvement solutions and corrective actions should also be visible. The work process 340 can clearly document the process utilized to identify relevant systems to evaluate, rating scale, personnel involved, and training for appropriate personnel.

A determination can be made whether gaps that need to be fixed exists, as depicted at block 660. If the analysis of the current system(s) relative to root cause manifestations identified gaps, then the team can identify potential improvement solutions and specific corrective actions required, as depicted at block 665. Potential improvement solutions can be provided, as depicted at block 666 along with specific corrective actions as illustrated at block 667. A potential improvement solution may have one or more specific corrective actions that must be implemented to achieve the solution. The improvement solutions and specific corrective actions may be identified by an operations representative responsible for site management systems or an appropriate discipline or practice leads as needed.

The potential improvement solutions as indicated at block 666 can be identified based on the gaps identified in the previous step. The improvement solutions can, at a minimum, target current systems that the investigation team feels do not address the root cause manifestations (e.g., gap ratings with no coverage or rating=1). The potential improvement solutions can be identified through, for example, team brainstorming, expert review, and analysis (i.e., the use consultants as needed) or review of industry best practices. The potential improvement solutions can also be identified based on recent industry incidents and resulting recommendations. The reporting system 350 can allow the documentation of improvement solutions. The work process 340 can clearly document the process utilized to identify the improvement solutions, corrective actions, and the mechanisms to identify the relevant site personnel (e.g., discipline leads).

Thereafter, the potential improvement solutions can be prioritized by a site leadership team in order to determine important improvements, as illustrated at blocks 670 and 675. The potential improvement solutions can be prioritized by inputting the potential improvement solutions and generating high priority improvement solutions as output as depicted at block 676. The potential improvement solutions can be prioritized by an incident analysis team representative or an operations representative responsible for site management systems. The solutions that address gaps related to frequent failures and high impact incidents can be given higher priority. Such an approach ensures the improvement solutions that are implemented reduce the most frequent and costly problems that have occurred. The reporting system 350 can support a way to aggregate the incident costs across failure modes to identify high priority improvement solutions. The work process 340 can clearly document the process utilized to prioritize improvement solutions so that consistent practices can be utilized.

The high priority improvement solutions can be implemented by the "owner" of the appropriate management system or operation practice area in order to determine the changes that need to be made for each corrective action, as depicted at blocks 680 and 685. The improvement solutions 685 can be implemented by inputting the high priority improvement solutions 676 and generating implemented corrective actions as output as indicated at block 686. The corrective actions represent the manner in which the current system should be altered to address the gaps identified for the systemic failures and root causes. The detailed plans for implementing the corrective actions can then be developed and executed. The individuals can be assigned responsibility for completing specific corrective actions for each improvement solution.

The implemented corrective actions can be monitored by the owner of appropriate system or operation practice area in order to determine how solutions are working, as illustrated at blocks 690 and 695. The implemented corrective actions can be monitored by inputting leading and lagging metrics (i.e., see blocks 696 and 697) in order to make sure the solutions are actually working. The leading and lagging metrics can be utilized to monitor improvement solution impact. The incident management program and work process can define targets for both leading and lagging metrics to determine whether the improvement solutions (based on specific corrective actions) are achieving desired results. For example, if the specific corrective actions for high priority solutions identified in the previous step are implemented properly, there can be a reduction in incidents related to the systemic failure and root causes covered by the improvement solutions (lagging metrics). In addition, leading metrics specific to each current system can be continuously monitored to evaluate post-implementation impact of the solution's corrective action(s). For example, improvements in alarm management practices such as alarm rationalization can reduce incidents related to alarm problems (lagging metric) as well as on-going alarm rates (leading metric). The work process 340 can specify the metrics to track, frequency of monitoring, personnel responsible for monitoring for improvement, and targets steps to perform if improvements are not working. The critical performance indicators in the form of leading and lagging metrics can be monitored to ensure improvements are achieving the desired effect. The level of monitoring and specific metrics utilized to define success can vary from site to site.

A determination can be made if the improvement solutions are working, as shown at block 698. If the solutions are working the process ends, otherwise the process can be continued from block 650. Note that as utilized herein the term "work environment" can be such as, for example, process control, nuclear power, health care, military, and the like. Note that although the embodiments discussed herein generally relate to a management system within a process control domain, it can be appreciated that such embodiments may be implemented in the context of other work environments and are not limited to the process control system described herein. The discussion of process control systems, as indicated herein, is presented for general illustrative purposes only.

Note that an alternative embodiment with respect to method 600 involves tying the incident root causes to each incident failure. It is possible, however, to only capture root causes and not failures. The same basic work process could apply, but one would have less data to consider (only root causes, not failures AND root causes).

It is believed that by utilizing the system and approach described herein, the systemic failures and root causes of incidents in the work environment can be effectively identified. The method described herein also can be adapted for providing corrective actions to prevent a recurrence of the incident and monitoring the solution success. Such a method 600 can be utilized within the work environment to identify systemic failures (or problems), root causes of the failures, opportunities to improve existing systems, methods for developing corrective actions, and techniques for tracking the effectiveness of improvement changes.

The work process 340 can integrate with the incident reporting and analysis system 350 to track improvement or changes needed to an alarm or other operations systems. The work process 340 can be utilized to analyze emissions related incidents to identify problems and root causes that can lead to tuning of the process. The work process 340 includes incident investigation/analysis functions to improve the depth and value of information on a network. For example, employees can review recent past incidents, trends, common problems, root causes, and planned improvement solutions. The disclosed approach can also be utilized in a process control domain, materials manufacturing, and a security domain for analyzing security incidents for common problems and root causes that can lead to new or improvements to existing systems.

Figure 8:
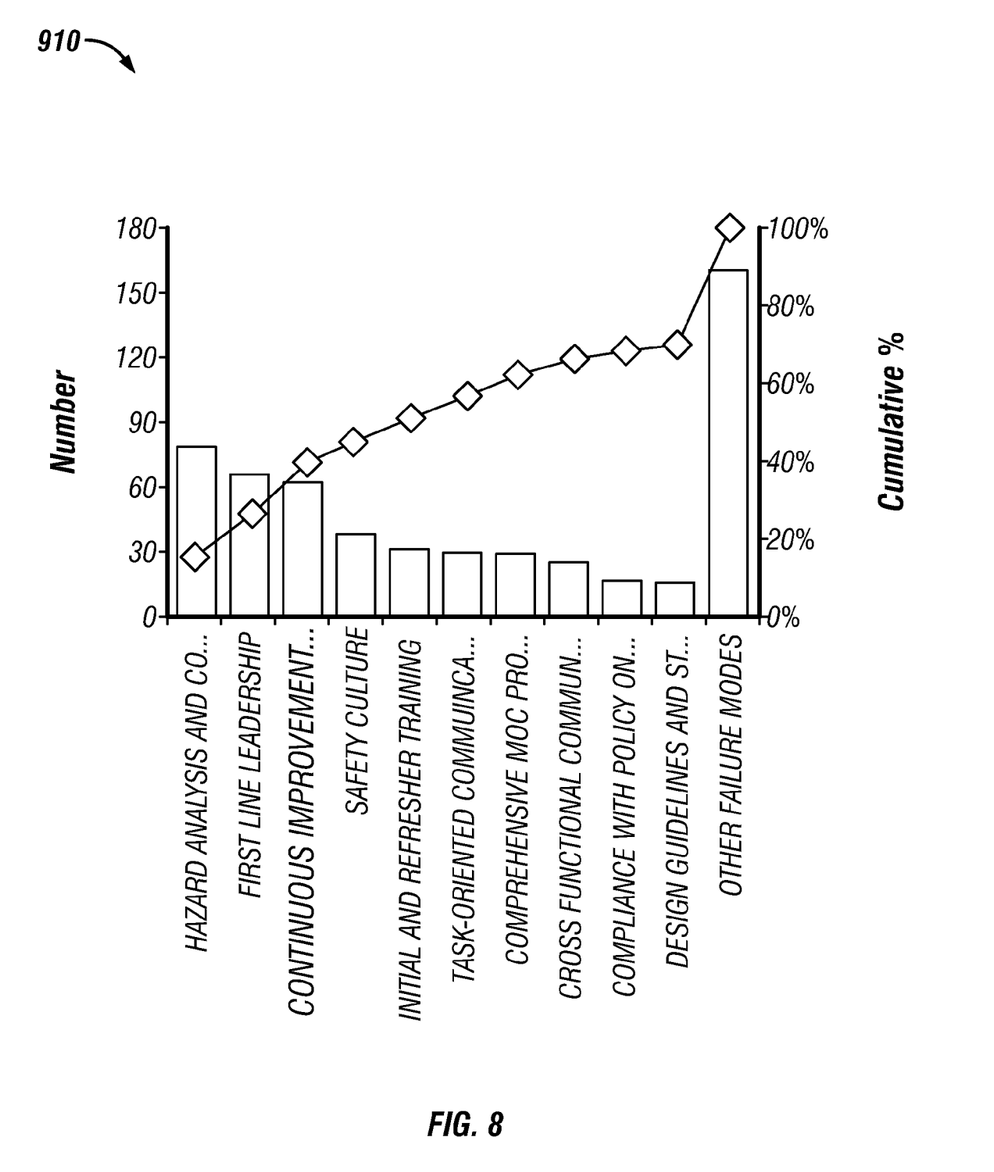
FIG. 8 illustrates a graph depicting example data indicative of identified systemic failures, in accordance with an embodiment.

FIG. 8 illustrates a graph 910 depicting example data indicative of identified systemic failures, in accordance with an embodiment. As indicated earlier, systemic failures could come from two sources: (1) directly from the common language (if the site has one) or (2) via clustering or some other consensus activity (if there is no common language). Graph 910 therefore illustrates an example of systemic failures identified in one particular project. As evidence from graph 910, one can see that the top (most frequent) systemic failure is related to "Hazard Analysis and communication".

Figure 9:
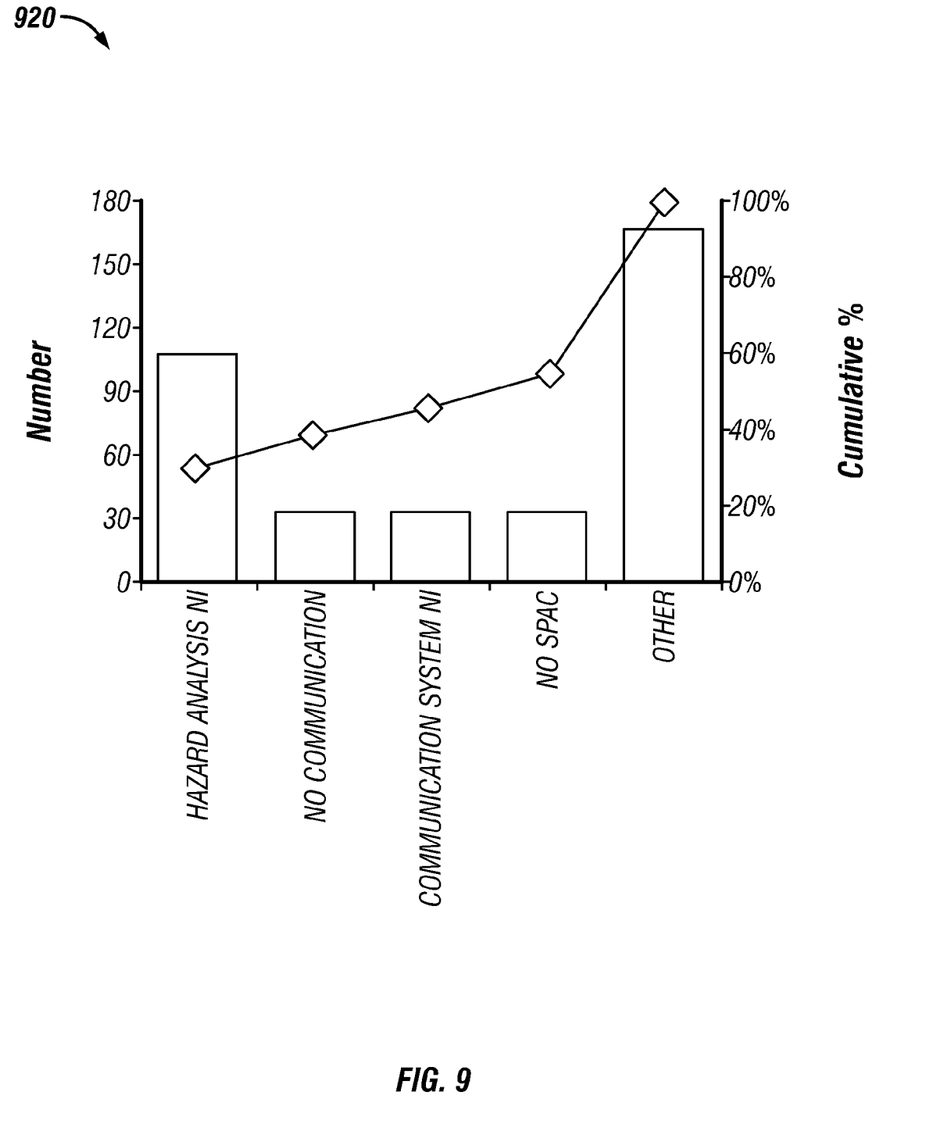
FIG. 9 illustrates a graph depicting example data indicative of a root cause profile, in accordance with an embodiment.

FIG. 9 illustrates a graph 920 depicting example data indicative of a root cause profile, in accordance with an embodiment. Note that a root cause profile is a frequency count of the root causes that is mapped to each systemic failure. The example depicted in graph 920 illustrates a root cause profile for the "Hazard analysis and communication" systemic failure mode. Graph 920 shows that the most common root cause (reason for the systemic failure across the incident sample) was due to "Hazard Analysis Needs Improvement". Related root causes included "No communication", "Poor communication—communication system needs improvement", and "No SPAC—standards, policies, administrative controls".

Figure 10:
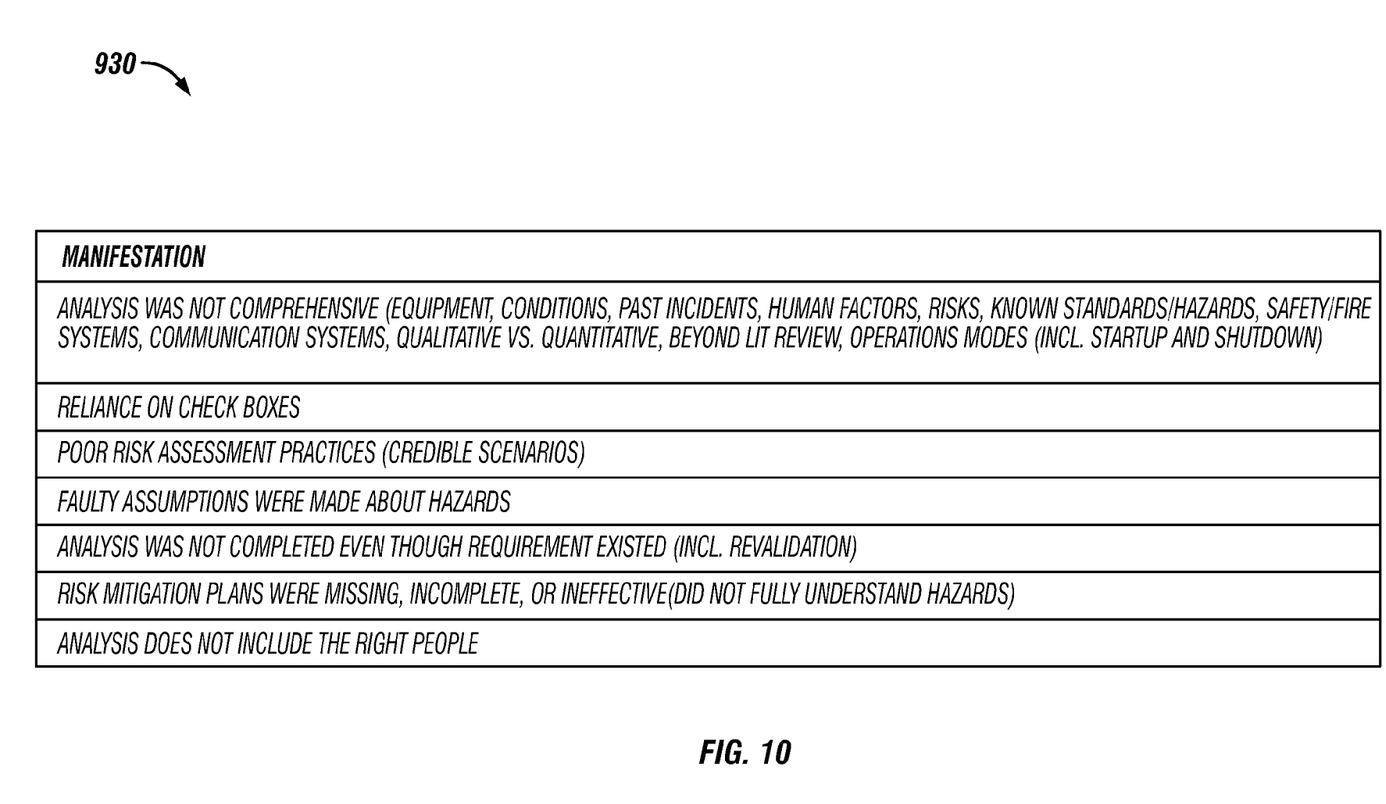
FIG. 10 illustrates an example table representation of a compilation of captured root cause manifestations in a list where each row described one (or more if manifestations were similar across incidents) manifestation of the root cause, in accordance with an embodiment.

FIG. 10 illustrates an example table 930 representation of a compilation of captured root cause manifestations in a list where each row describes one (or more if manifestations were similar across incidents) manifestation of the root cause, in accordance with an embodiment. As indicated previously, root cause manifestations are the detailed manner in which a root cause manifests/expresses in a particular incident. The review of incident details (e.g., see block 611) is important because the embodiments involve analyzing incident details to identify the reason that the root causes resulted in the systemic failure. Refer again to the example presented above (i.e. FIG. 9)—the "Hazard analysis and communication" systemic failure found "no communication" and "poor communication" as root causes in the profile. Without looking back at details, the analyst team will not understand the aspect of "no communication" and "poor communication" they should improve. FIG. 10 thus illustrates the root cause manifestations for the "Hazard analysis needs improvement" root cause from the profile for the "Hazard analysis and communications" systemic failure. A team that is analyzing current systems applicable to hazard analyses for gaps would evaluate each system element relative to the manifestations listed to identify potential improvement solutions.

Note that the methodology disclosed herein may be implemented in the context of a computer-useable medium that contains a program product. Programs defining particular functions/instructions such as those depicted in the accompany figures can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as, but not limited to, Random Access Memory (RAM), and communication media such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having components in the form of hardware, software, or a combination of software and hardware as described herein or their equivalent.

Thus, the disclosed methodology (or at least portions of the disclosed embodiments) may be deployed, for example, in the context of process software in the context of a computer system or data-processing system such as that depicted, for example, in FIGS. 1-2. Instructions can, for example, be stored in, for example, the main memory 102 and/or mass storage 107 of FIG. 1 and then processed via the processor 101. Along these same lines, it can be appreciated that the work process discussed herein can be implemented in the context of one or more "modules".

In the computer programming arts, a "module" can be implemented as a collection of routines and data structures that performs particular tasks or implements a particular abstract data type. Modules generally are composed of two parts. First, a software module may list the constants, data types, variable, routines, and the like that can be accessed by other modules or routines. Second, a software module can be configured as an implementation, which can be private (i.e., accessible perhaps only to the module), and that contains the source code that actually implements the routines or subroutines upon which the module is based. Thus, for example, the term module, as utilized herein, generally refers to software modules or implementations thereof. Such modules can be utilized separately or together to form a program product that can be implemented through signal-bearing media including transmission media and recordable media. One or more modules can therefore be implemented to process the instructions described and illustrated herein, for example, with respect to FIGS. 5-7.

While the embodiments have been particularly shown and described with reference to one or more embodiments, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for identifying systematic failures and root causes of incidents, said comprising the steps of:
identifying, with the use of a processor, at least one failure with respect to an incident and a root cause associated with said at least one failure in a work environment, wherein said work environments comprise at least one of process control, nuclear power, health care, military, and manufacturing, to determine systemic failures across an incident sample, root cause profiles, and root cause manifestations;
identifying, with the use of the processor, root causes of said systemic failures by summing incident root causes relating to top failure modes and extracting said root cause profiles for said systemic failures, wherein said root cause profiles illustrate a distribution of said root causes identified for said systemic failures across said incident sample;
prioritizing, with the use of the processor, an improvement solution to identify a high priority improvement solution and implementing said high priority improvement solution based on at least one corrective action for said at least one failure in response to analyzing said at least one failure to identify said systemic failures, said root cause profiles, and said root cause manifestations; and
monitoring, with the use of the processor, an impact of said improvement solution on said work environment utilizing specified leading metrics and specified lagging metrics and a critical performance indicator to determine if said improvement solution based on said at least one corrective action prevents said recurrence of said at least one failure.

2. The method of claim 1 further comprising analyzing, with the use of the processor, said at least one failure, said root cause and said improvement solution impact associated with said incident through a structured analysis approach utilizing a common language.

3. The method of claim 1 further comprising performing, with the use of the processor, an incident investigation with respect to said incident to identify said at least one failure and said root cause of said at least one failure associated with said incident.

4. The method of claim 1 further comprising:
identifying, with the use of the processor, systemic failures across said incident sample; and
said computer determining, with the use of the processor, root cause profiles from incident sample.

5. The method of claim 1 further comprising identifying, with the use of the processor, root cause manifestations for said root causes in said root cause profile of said systemic failures across said incident sample.

6. The method of claim 1 further comprising identifying, with the use of the processor, said improvement solution based on analysis of said failure root cause manifestation associated with said systemic failures and said root cause profile.

7. The method of claim 1 further comprising tracking, with the use of the processor, occurrences of said incident utilizing an event monitoring and reporting system wherein said event monitoring and reporting system support analysis of a systemic failure.

8. A system for identifying systematic failures and root causes of incidents, said system comprising:
a processor;
a data bus coupled to said processor; and
a non-transitory computer readable medium storage device storing computer program code, said computer program code comprising program instructions executable by said processor, said program instructions comprising:
first program instructions to identify at least one failure with respect to an incident and a root cause associated with said at least one failure in a work environment, wherein said work environments comprise at least one of process control, nuclear power, health care, military, and manufacturing, to determine systemic failures across an incident sample, root cause profiles, and root cause manifestations;
second program instructions to identify root causes of said systemic failures by summing incident root causes relating to top failure modes and extract said root cause profiles for said systemic failures, wherein said root cause profiles illustrate a distribution of said root causes identified for said systemic failures across said incident sample;
third program instructions to prioritize an improvement solution to identify a high priority improvement solution and implement said high priority improvement solution based on at least one corrective action for said at least one failure in response to analyzing said at least one failure to identify said systemic failures, said root cause profiles, and said root cause manifestations; and fourth program instructions to monitor an impact of said improvement solution on said work environment utilizing specified leading metrics and specified lagging metrics and a critical performance indicator to determine if said improvement solution based on said at least one corrective action prevents said recurrence of said at least one failure.

9. The system of claim 8 wherein said program instructions further comprise fifth program instructions to analyze said at least one failure, said root cause and said improvement solution impact associated with said incident through a structured analysis approach utilizing a common language.

10. The system of claim 8 wherein said program instructions further comprise fifth program instructions to perform an incident investigation with respect to said incident in order to identify said at least one failure and said root cause of said at least one failure associated with said incident.

11. The system of claim 8 wherein said program instructions further comprise:
fifth program instructions to identify systemic failures across said incident sample; and
sixth program instructions to determine root cause profiles from incident sample.

12. The system of claim 8 wherein said program instructions further comprise fifth program instructions to identify root cause manifestations for said root causes in said root cause profile of said systemic failures across said incident sample.

13. The system of claim 8 wherein said program instructions further comprise:
fifth program instructions to identify said improvement solution based on analysis of said failure root cause manifestation associated with said systemic failures and said root cause profile;
sixth program instructions to track occurrences of said incident utilizing an event monitoring and reporting system wherein said event monitoring and reporting system support analysis of a systemic failure.

14. A non-transitory computer-readable medium storage device, said non-transitory computer-readable medium storage device storing computer program code for identifying systematic failures and root causes of incidents, said computer program code comprising program instructions executable by a processor, said program instructions comprising:
first program instructions to identify at least one failure with respect to an incident and a root cause associated with said at least one failure in a work environment, wherein said work environments comprise at least one of process control, nuclear power, health care, military, and manufacturing, to determine systemic failures across an incident sample, root cause profiles, and root cause manifestations;
second program instructions to identify root causes of said systemic failures by summing incident root causes relating to top failure modes and extract said root cause profiles for said systemic failures, wherein said root cause profiles illustrate a distribution of said root causes identified for said systemic failures across said incident sample;
third program instructions to prioritize an improvement solution to identify a high priority improvement solution and implement said high priority improvement solution based on at least one corrective action for said at least one failure in response to analyzing said at least one failure to identify said systemic failures, said root cause profiles, and said root cause manifestations; and
fourth program instructions to monitor an impact of said improvement solution on said work environment utilizing specified leading metrics and specified lagging metrics and a critical performance indicator to determine if said improvement solution based on said at least one corrective action prevents said recurrence of said at least one failure.

15. The non-transitory computer readable medium storage device of claim 14 wherein said program instructions further comprise fifth program instructions to analyze said at least one failure, said root cause and said improvement solution impact associated with said incident through a structured analysis approach utilizing a common language.

16. The non-transitory computer readable medium storage device of claim 14 wherein said program instructions further comprise fifth program instructions to perform an incident investigation with respect to said incident in order to identify said at least one failure and said root cause of said at least one failure associated with said incident.

17. The non-transitory computer readable medium storage device of claim 14 wherein said program instructions further comprise:
fifth program instructions to identify systemic failures across said incident sample; and
sixth program instructions to determine root cause profiles from incident sample.

18. The non-transitory computer readable medium storage device of claim 14 wherein said program instructions further comprise:
fifth program instructions to identify root cause manifestations for said root causes in said root cause profile of said systemic failures across said incident sample; and
sixth program instructions to identify said improvement solution based on analysis of said failure root cause manifestation associated with said systemic failures and said root cause profile.

19. The non-transitory computer readable medium storage device of claim 14 wherein said program instructions further comprise:
fifth program instructions to track occurrences of said incident utilizing an event monitoring and reporting system wherein said event monitoring and reporting system support analysis of a systemic failure.

\* \* \* \* \*